(12) United States Patent
McDaniel

(10) Patent No.: US 6,510,214 B1
(45) Date of Patent: Jan. 21, 2003

(54) SYSTEM AND METHOD OF DETECTING OVERLOAD IN A SERVICE CONTROL POINT OF A TELECOMMUNICATIONS NETWORK

(75) Inventor: David W. McDaniel, Dallas, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/223,234

(22) Filed: Dec. 30, 1998

(51) Int. Cl.$^7$ .......................... H04M 15/00; H04M 7/00
(52) U.S. Cl. ............... 379/134; 379/112.04; 379/112.1; 379/221.09
(58) Field of Search ........................... 379/111, 112.01, 379/112.04, 112.1, 133, 134, 221.03, 221.05, 221.06, 221.08, 221.09, 221.12

(56) References Cited

U.S. PATENT DOCUMENTS

| | | | | |
|---|---|---|---|---|
| 5,825,860 A | * | 10/1998 | Moharram | 379/133 |
| 5,883,939 A | * | 3/1999 | Friedman et al. | 379/9 |
| 6,018,519 A | * | 1/2000 | Ginzboorg | 370/236 |
| 6,330,313 B1 | * | 12/2001 | Hunt | 379/133 |
| 6,363,411 B1 | * | 3/2002 | Dugan et al. | 709/202 |
| 6,425,005 B1 | * | 7/2002 | Dugan et al. | 709/223 |

* cited by examiner

Primary Examiner—Binh Tieu

(57) ABSTRACT

A service control point (24) includes an overload control system (50) that determines an overload rating (70) for an intelligent processing unit (82). The overload control system (50) includes a latency estimator (52) that requests and receives a latency (66) for a service logic interpreter (62). A queue depth store (54) receives a queue depth (68) from the service logic interpreter (62). A common memory (56) stores the latency (66) and the queue depth (68) in memory mapped files. A load estimator (58) determines the overload rating (70) in response to the latency (66) and the queue depth (68). The load estimator (58) compares the overload rating (70) to a previous overload rating and issues an internal problem report if a difference is detected. A TCAP interface (60) and a service logic program (64) assess the overload rating (70) to determine if incoming service requests should be passed on to the service logic interpreter (62), rerouted, or discarded. The load estimator (58) provides the overload rating (70) to an overload server (84). The overload server (84) determines a system wide overload rating in response to the overload rating (70) received from a plurality of intelligent processing units (82). The overload server (84) compares the system wide overload rating to a previous system wide overload rating and, upon detecting a difference, issues an internal problem report and provides the new system wide overload rating to a provisioning system (100).

30 Claims, 3 Drawing Sheets

SYSTEM AND METHOD OF DETECTING OVERLOAD IN A SERVICE CONTROL POINT OF A TELECOMMUNICATIONS NETWORK

TECHNICAL FIELD OF THE INVENTION

The present invention relates in general to telecommunications signal processing and more particularly to a system and method of detecting overload in a service control point of a telecommunications network.

BACKGROUND OF THE INVENTION

In a telecommunications network, a service control point may interact with multiple network service switching points. In this scenario, it is likely that there will be periods when the service control point receives more transaction messages from its associated service switching points than it can process. Also, the service management system or operation support systems may present the service control point with service version update commands at a time when all of its resources are applied to servicing transaction messages from service switching points. In this overload condition, input queues back up and can eventually lead to queue overflow that will result in message loss or system failure. Therefore, it is desirable to provide a capability to detect such an overload condition and take actions to alleviate the situation.

SUMMARY OF THE INVENTION

From the foregoing, it may be appreciated that a need has arisen for a technique to detect overload within a service control point of a telecommunications network. In accordance with the present invention, a system and method of detecting overload in a service control point of a telecommunications network are provided that substantially eliminate or reduce disadvantages and problems associated with conventional service control point operation.

According to an embodiment of the present invention, there is provided a method of detecting overload in a service control point of a telecommunications network that includes sending a latency request to a service logic interpreter in an intelligent processing unit of a service control point. In response to the latency request, the service logic interpreter provides a latency response from which a latency for the service logic interpreter is determined and stored in a memory. A queue depth for a queue in the service logic interpreter is also stored in the memory. In response to the latency and the queue depth stored in the memory, an overload rating is determined for the intelligent processing unit of the service control point.

The present invention provides various technical advantages over conventional service control point operation. For example, one technical advantage is to determine an overload rating of an intelligent processing unit within a service control point. Another technical advantage is to discard or reroute incoming service messages in response to an overload rating of the service control point. Yet another technical advantage is to determine a system wide overload rating for a service control point having multiple intelligent processing units. Still another technical advantage is to minimize processing time by analyzing overload condition of a service control point only when there is a change in the overload rating. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
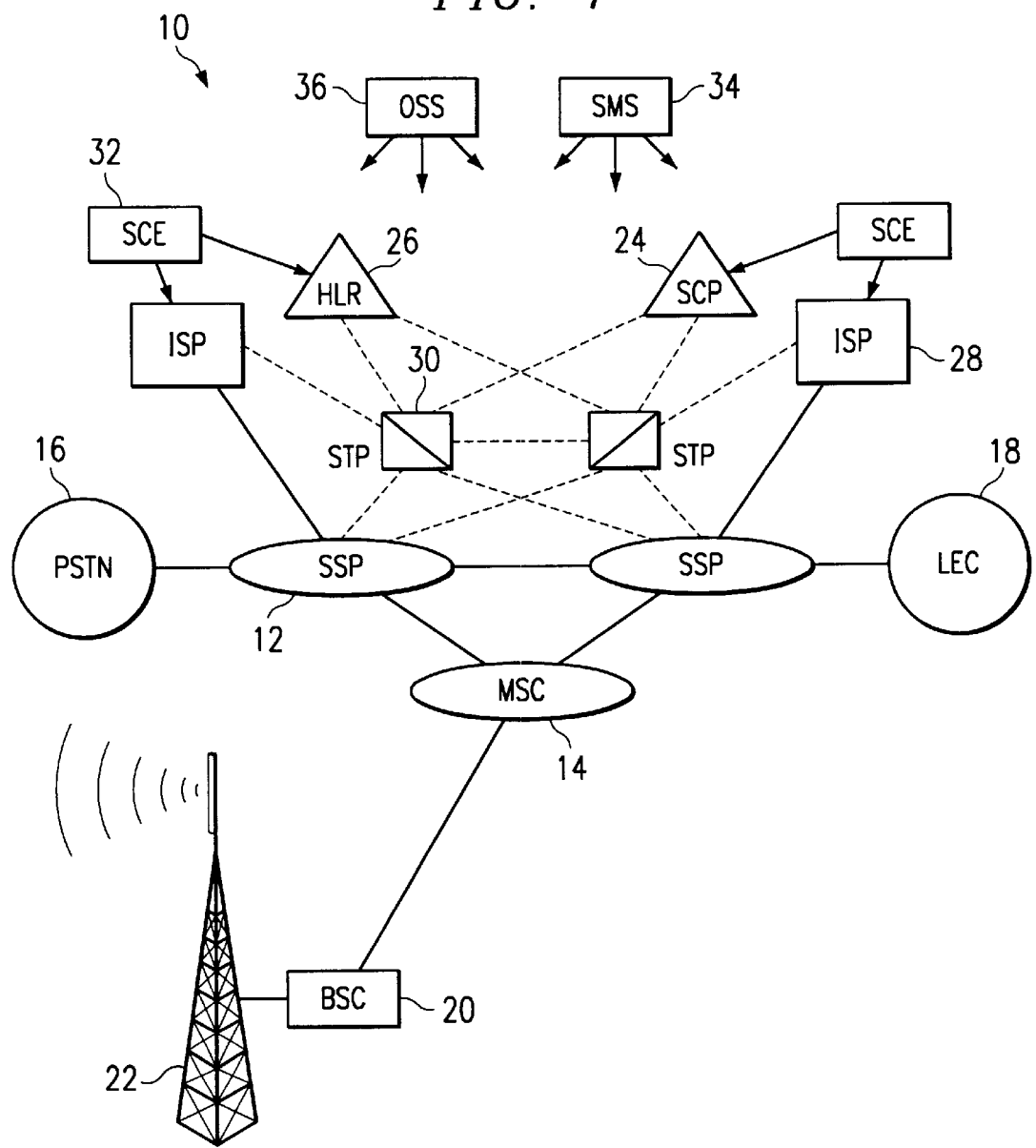
FIG. 1 illustrates a simplified block diagram of a telecommunications network.

FIG. 1 is a block diagram of an advanced intelligent network 10. Advanced intelligent network 10 includes a service switching point 12 and a mobile switching center 14 that provide delivery functions in order to transport telecommunication signals within advanced intelligent network 10. Service switching point 12 is a network switch that routes telecommunications traffic to and from other network elements such as a public switch telephone network 16 and a local exchange carrier 18. Mobile switching center 14 is a network switch used in a wireless network that routes telecommunications traffic to a base switching center 20 for transmission by an antenna 22. Service switching point 12 and mobile switching center 14 provide the interface to the end user and can recognize when telecommunication traffic requires advanced intelligent network involvement.

The service delivery functions provided by service switching point 12 and mobile switching center 14 are managed by a service control point 24, a home location register 26, and an intelligent service peripheral device 28. Advanced intelligent network 10 preferably uses the signaling system 7 (SS7) protocol for interaction between the service delivery functions of service switching point 12 and mobile switching center 14 and the service control functions provided by service control point 24, home location register 26, and intelligent service peripheral device 28. A signal transfer point 30 is a packet switch used to facilitate routing of SS7 packets between various signaling entities within advanced intelligent network 10.

When conditions for advanced intelligent network service logic involvement are met, service switching point 12 sends an incoming service request SS7 message to service intelligence within service control point 24. Service switching point 12 participates in a dialog with the service intelligence such that the service intelligence guides the service switching point 12 for subsequent handling of the advanced intelligent network call. In order to provide these functions, service switching point 12 must support a call model which includes trigger points at appropriate points in call (PIC) and detection points (DP). These trigger points provide opportunities where decisions can be taken to seek assistance from the service intelligence. Call models are defined in respective standards documents from Bellcore, ITU, and ETSI.

Before a new service is deployed in the advanced intelligent network environment, a service description is created which describes how the given service should work. The service is then designed and simulated with the help of a service creation environment 32. Service creation environment 32 uses software independent building blocks (SIBBs) to create a service logic program (SLP) associated with the service. Once the service logic is verified, the executable code associated with the service logic program is downloaded to the associated service control elements, i.e. service control point 24, home location register 26, and intelligent service peripheral device 28. A service management system (SMS) 34 provides the necessary operation support functions to provision, maintain, and administer the service. A back office operating support system (OSS) 36 provides the necessary network management and billing functions.

Service switching points 12 typically use the ISUP layer of the SS7 stack for interswitch connection control. Each service switching point 12 in a network is assigned a point code. The ISUP based connection control messages are routed between switches on the basis of these point codes. Service control point 24 is designed to appear as another point code in the signaling network. This allows service switching point 12 to communicate with service control point 24 using the standard ISUP messages. Service control point 24 is designed to serve as an outboard system in order to provide the requisite intelligence in a centralized manner so that the intelligence can be shared across a network of service switching points 12.

Figure 2:
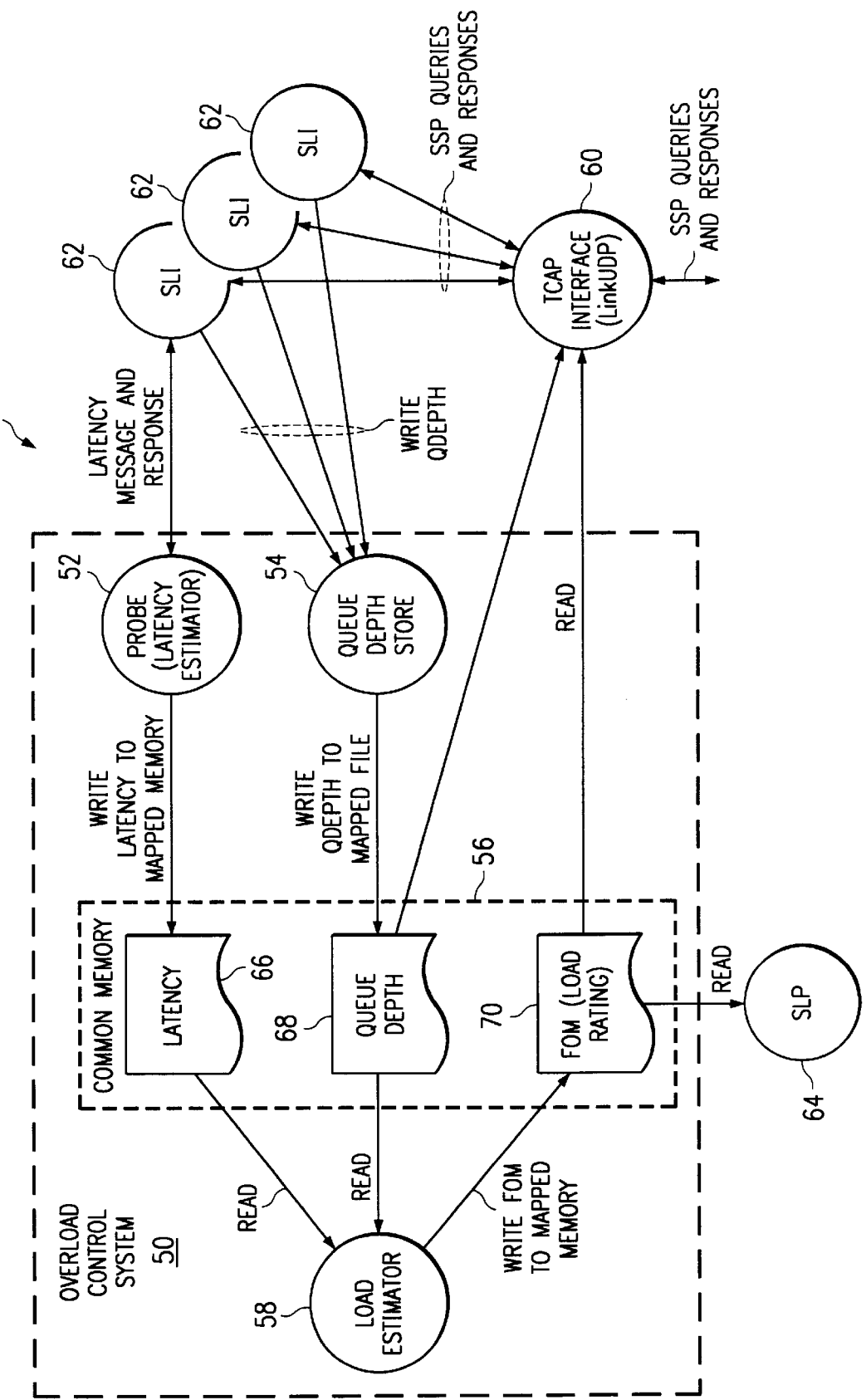
FIG. 2 illustrates a simplified block diagram of an overload control system within a service control point of the telecommunications network.

FIG. 2 is a block diagram of an overload control system 50 of an intelligent processing unit within service control point 24. Overload control system 50 provides a capability to detect an overload condition and to take action to alleviate the overload condition. An overload condition occurs when the processing demands of incoming service requests exceed system capacity. Overload control system 50 includes a latency estimator 52, a queue depth store 54, a common memory 56, and a load estimator 58. Service control point 24 receives incoming service requests from and provides responses to service switching points 12 through a transaction capabilities application part (TCAP) interface 60. TCAP interface 60 routes incoming service requests to a service logic interpreter 62 for processing. Service logic interpreter 62 represents the main processing power for incoming service requests and provides the interpretation for executing a service logic program 64 in response to the incoming service request. Thus, overload control system 50 measures the latency, amount of processing delay for an incoming service request in service logic interpreter 62, and a buffer availability within service logic interpreter 62 in order to determine an overload rating that is used as a measurement of system overload conditions.

In operation, latency estimator 52 sends a latency request to service logic interpreter 62. Service logic interpreter 62 sends a latency response to latency estimator 52 in response to the latency request. The latency response includes a latency 66 for service logic interpreter 62. Latency estimator 52 writes latency 66 into common memory 56, preferably in a memory mapped file. Latency estimator 52 preferably sends a latency request to service logic interpreter 62 on a periodic basis. Queue depth store 54 reads a queue depth 68 of service logic interpreter 62 and writes queue depth 68 into common memory 56, preferably in a memory map file. Queue depth store 54 preferably reads queue depth 68 from service logic interpreter 62 on a periodic basis. Load estimator 58 reads latency 66 and queue depth 68 from common memory 56. Load estimator 58 determines an overload rating 70 for the intelligent processing unit based upon latency 66 and queue depth 68. Load estimator 58 writes overload rating 70 into common memory 56, preferably in a memory map file. Load estimator 58 compares the most recent overload rating 70 to a previous overload rating. If the new overload rating 70 is different than the previous overload rating, an internal problem report is issued.

TCAP interface 60 and service logic program 64 poll the overload rating 70 in common memory 56 in order to determine if incoming service requests should be passed to service logic interpreter 62, rerouted, or discarded. Error messages may be sent to an originating SSP 12 to inform that its incoming service request was discarded due to an overload condition. TCAP interface 60 transitions into an overload state when overload rating 70 exceeds a desired upper threshold level. TCAP interface 60 transitions out of the overload state when overload rating 70 falls below a desired lower threshold level. Internal problem reports may be issued whenever TCAP interface 60 leaves or enters the overload state. TCAP interface 60 preferably discards messages while in the overload state and keeps track of the number of messages discarded. a SIBB may be used to sample overload rating 70 for service logic program 64. Service logic program 64 may use this SIBB to determine when requests should be discarded while in the overload state.

Figure 3:
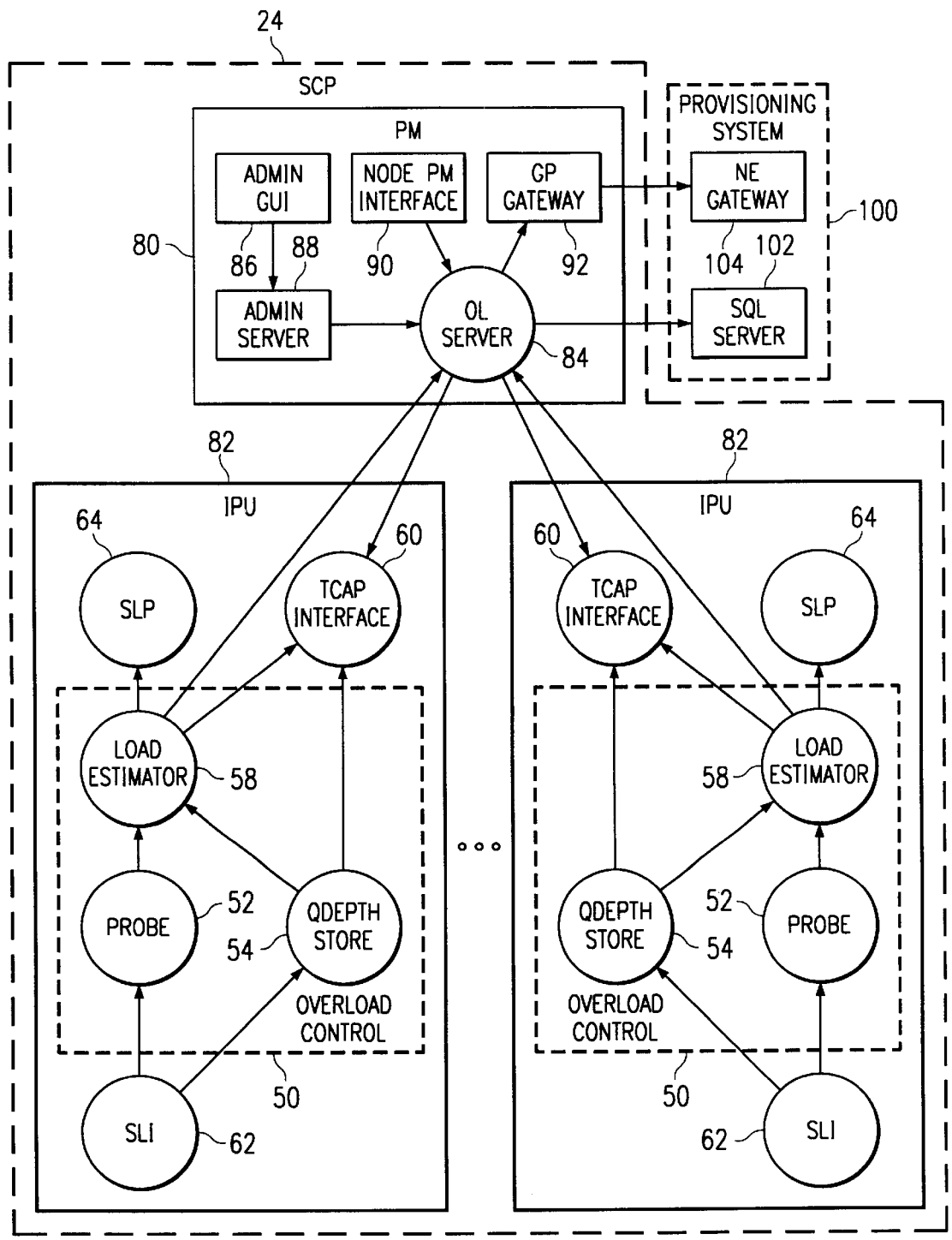
FIG. 3 illustrates a simplified block diagram of a service control point with multiple intelligent processing units.

FIG. 3 is an overall block diagram of service control point 24. Service control point 24 includes a platform manager 80 and one or more intelligent processing units 82. Platform manager 80 includes an overload server 84, a graphical user interface 86, an administration server 88, a node platform manager interface 90, and a general provisioning gateway 92. Overload server 84 receives overload ratings from each intelligent processing unit 82 within service control point 24. Overload server 84 determines a system wide overload rating based on each overload rating of intelligent processing units 82. Overload server 84 compares the system wide overload rating to a previous system wide overload rating. If the system wide overload rating is different than the previous system wide overload rating, an internal problem report is issued. Changes to the system wide overload rating are exported to a provisioning system 100 that includes a structured query language (SQL) server 102 and a network element gateway 104. Overload server 84 preferably exports the new system wide overload rating to SQL server 102. Preferably, overload server 84 only generates a new system wide overload rating in response to a change in an overload rating at any one of intelligent processing units 82. Overload server 84 may also provide the system wide overload rating upon request to generic provisioning gateway 92 that implements the external server side interface in order to send the system wide overload rating to network element gateway 104.

Administration server 88 includes parameters to allow customization of the overload behavior of service control point 24. Examples of parameters include a number that represents the percentage of messages that should be discarded while a system is in an overload state, run time parameters that affect the determination of the overload rating within each intelligent processing unit, and configuration data which specifies the connection to provisioning system 100. Administration server 88 provides parameters to intelligent processing units 82 through overload server 84. TCAP interface 60 reads the parameters to determine how many messages should be discarded. For each overload state, TCAP interface 60 will discard a certain percentage of messages- based on the parameters provided by administration server 88. Load estimator 58 reads the parameters provided by administration server 88 that control how overload rating 70 is determined. Overload server 84 will read the parameters from administration server 88 in order to determine the system wide overload rating and to determine the connections to be made to one or more provisioning systems 100 including SMS 34. For example, the system wide overload rating may be based on the worst overload rating of intelligent processing units 82. Any time these parameters are updated, overload server 84 will propagate the changes to each intelligent processing unit 82. Graphical user interface 86 provides the capability to externally configure and dynamically change the parameters within administration server 88 that affect the overload behavior.

Note platform manager interface 90 provides overload server 84 with the configuration of service control point 24. Overload server 84 identifies the active intelligent processing units 82 within service control point 24 through communications with node platform manager interface 90. Overload server 84 registers with node platform manager interface 90 in order that overload server 84 can receive configuration changes that occur within service control point 24. Node platform manager interface 90 then notifies overload server 84 whenever an intelligent processing unit 82 has come into service so that overload server 84 can add the new intelligent processing unit 82 to its configuration list. Node platform manager interface 90 also notifies overload server 84 whenever an intelligent processing unit 82 has come out of service so that overload server 84 can remove the inactive intelligent processing unit 82 from its configuration list. In this manner, overload server 84 can accurately keep track of the system wide overload rating.

Thus, it is apparent that there has been provided, in accordance with the present invention, a system and method of detecting overload in a service control point of a telecommunications network that satisfies the advantages set forth above. Although the present invention has been described in detail, it should be understood that various changes, substitutions, and alterations readily ascertainable by those skilled in the art may be made herein without departing from the spirit and scope of the present invention as defined by the following claims.

What is claimed is:

1. A method of detecting overload in a service control point of a telecommunications network, comprising:
   sending a latency request to a service logic interpreter in an intelligent processing unit;
   receiving a latency response from the service logic interpreter;
   determining a latency from the latency response;
   storing the latency in a memory;
   storing a queue depth of the service logic interpreter in the memory;
   determining an overload rating for the intelligent processing unit in response to the latency and the queue depth stored in the memory.

2. The method of claim 1, further comprising:
   comparing the overload rating to a previous overload rating.

3. The method of claim 2, further comprising:
   issuing an internal problem report in response to the overload rating being different from the previous overload rating.

4. The method of claim 2, further comprising:
   discarding incoming messages to the service control point in response to the overload rating being different than the previous overload rating.

5. The method of claim 2, further comprising:
   storing the overload rating in response to the overload rating being different than the previous overload rating.

6. The method of claim 1, further comprising:
   determining a system wide overload rating from overload ratings of a plurality of intelligent processing units.

7. The method of claim 6, further comprising:
   comparing the system wide overload rating to a previous system wide overload rating.

8. The method of claim 7, further comprising:
   issuing an internal problem report in response to the system wide overload rating being different than the previous system wide overload rating.

9. The method of claim 6, further comprising:
   exporting the system wide overload rating to a provisioning system external to the service control point in response to the system wide overload rating being different than the previous system wide overload rating.

10. The method of claim 1, further comprising:
    providing a parameter that determines how the overload rating is determined.

11. A service control point for a telecommunications network, comprising:
    a service logic interpreter operable to process an incoming service request, the service logic interpreter including a queue to handle processing of the incoming service request;
    a latency estimator operable to determine a latency of the service logic interpreter in processing the incoming service request;
    a memory operable to receive and store the latency determined by the latency estimator, the memory operable to receive and store a queue depth of the queue of the service logic interpreter;
    a load estimator operable to determine an overload rating in response to the latency and the queue depth.

12. The service control point of claim 11, further comprising:
    a transactional capabilities application part interface operable to route the incoming service request to the service logic interpreter, the transactional capabilities application part interface operable to discard the incoming service request in response to the overload rating.

13. The service control point of claim 1, wherein the latency estimator sends a latency request to the service logic interpreter.

14. The service control point of claim 13, wherein the latency estimator sends the latency request on a periodic basis.

15. The service control point of claim 13, wherein the service logic interpreter provides a latency response to the latency estimator in response to the latency request.

16. The service control point of claim 11, wherein the load estimator is operable to compare the overload rating to a previous overload rating.

17. The service control point of claim 16, wherein the load estimator is operable to send the overload rating to the memory in response to the overload rating being different than the previous overload rating.

18. The service control point of claim 16, wherein the load estimator is operable to initiate issuance of an intelligent problem report in response to the overload rating being different than the previous overload rating.

19. The service control point of claim 16, further comprising:
    executing a service logic program according to the incoming service request in response to the overload rating being substantially similar to the previous overload rating.

20. The service control point of claim 11, further comprising:
   a service logic program module operable to discard the incoming service request in response to the overload rating.

21. The service control point of claim 11, further comprising:
   an overload server operable to receive the overload rating from the load estimator, the overload server operable to determine a system wide overload rating in response to the overload rating.

22. The service control point of claim 21, wherein the overload server is operable to compare the system wide overload rating to a previous system wide overload rating.

23. The service control point of claim 22, wherein the overload server is operable to export the system wide overload rating to an external provisioning system in response to the system wide overload rating being different than the previous system wide overload rating.

24. The service control point of claim 23, further comprising:
   a generic provisioning gateway operable to provide an interface for the overload server to the external provisioning system.

25. The service control point of claim 22, wherein the overload server is operable to initiate sending of an internal problem report in response to the system wide overload rating being different than the previous system wide overload rating.

26. The service control point of claim 21, further comprising:
   an administration server operable to provide a first parameter through the overload server to the transactional capabilities application part interface that determines whether the incoming service request is to be discarded.

27. The service control point of claim 26, further comprising:
   a graphical interface unit operable to allow a user to configure the first parameter.

28. The service control point of claim 26, wherein the administration server is operable to provide a second parameter through the overload server to the load estimator that controls how the load estimator determines the overload rating.

29. The service control point of claim 11, wherein the memory stores the latency, the queue depth, and the overload rating in a memory mapped file.

30. The service control point of claim 11, wherein the incoming service request is a signaling system no. 7 message.

* * * * *